United States Patent [19]

Heiberger

[11] Patent Number: 5,316,193
[45] Date of Patent: May 31, 1994

[54] BOTTLE WITH REFLECTIVE BARRIER LAYER FOR REDUCING ELECTROMAGNETIC ENERGY TRANSFER

[76] Inventor: Robert A. Heiberger, P.O. Box 4927, Boulder, Colo. 80306

[21] Appl. No.: 645,569

[22] Filed: Jan. 24, 1991

[51] Int. Cl.$^5$ ............................................. B67D 5/00
[52] U.S. Cl. ................................. 222/131; 222/183; 222/215; 220/450; 220/465; 220/469
[58] Field of Search ................ 222/92, 131, 183, 206, 222/215; 220/421, 422, 423, 424, 450, 215, 465, 468, 469

[56] References Cited

U.S. PATENT DOCUMENTS

| | | | |
|---|---|---|---|
| 1,475,439 | 11/1923 | Lamassiaude | 220/424 |
| 1,673,446 | 6/1928 | Eveleth | 222/183 |
| 2,024,065 | 12/1935 | Schellens | 220/424 |
| 2,338,604 | 1/1944 | Silveyra | 220/403 |
| 2,643,021 | 6/1953 | Freedman | 220/424 |
| 2,805,561 | 9/1957 | Emmert et al. | 222/131 |
| 2,987,212 | 6/1961 | Scanlon | 220/404 |
| 3,039,648 | 6/1962 | Busch | 220/403 |
| 3,119,543 | 1/1964 | Walker | 220/404 |
| 3,149,742 | 9/1964 | Hay et al. | 220/423 |
| 3,152,729 | 10/1964 | Piker | 220/465 |
| 3,164,148 | 1/1965 | Tolciss | 220/465 |
| 3,450,254 | 6/1969 | Miles | 220/404 |
| 3,484,011 | 12/1969 | Greenhalgh et al. | 220/404 |
| 4,055,268 | 10/1977 | Barthel | 220/423 |
| 4,196,721 | 4/1980 | Posnansky | 220/403 |
| 4,330,066 | 5/1982 | Berliner | 220/404 |
| 4,531,655 | 7/1985 | Putman | 220/404 |
| 4,635,814 | 1/1987 | Jones | 220/403 |
| 4,997,661 | 3/1991 | Kromer et al. | 220/450 |

Primary Examiner—H. Grant Skaggs
Attorney, Agent, or Firm—Timothy J. Martin; Dana S. Rewoldt

[57] ABSTRACT

A thermally insulated bottle has a container body which includes an inner body capable of holding a liquid contents, an outer cup of semi-rigid semi-flexible construction surrounding and spaced radially outward of the inner body, and a barrier layer disposed between the inner body and the outer cup. The outer cup has a construction capable of providing a moisture barrier and sufficient to provide mechanical strength capable of supporting the inner body in an upright relation. The inner body can be a cup similar to the outer cup, or a flexible bladder. The barrier layer can be a reflective metallic foil layer, or a substrate having a metallic material defining a mirrored surface thereon capable of reflecting radiant electromagnetic energy back toward the source thereof so as to reduce the transfer of such radiant energy across the barrier layer. The insulated bottle also includes a closure cap which fits over and is releasably sealable with an open top of the container body.

20 Claims, 2 Drawing Sheets

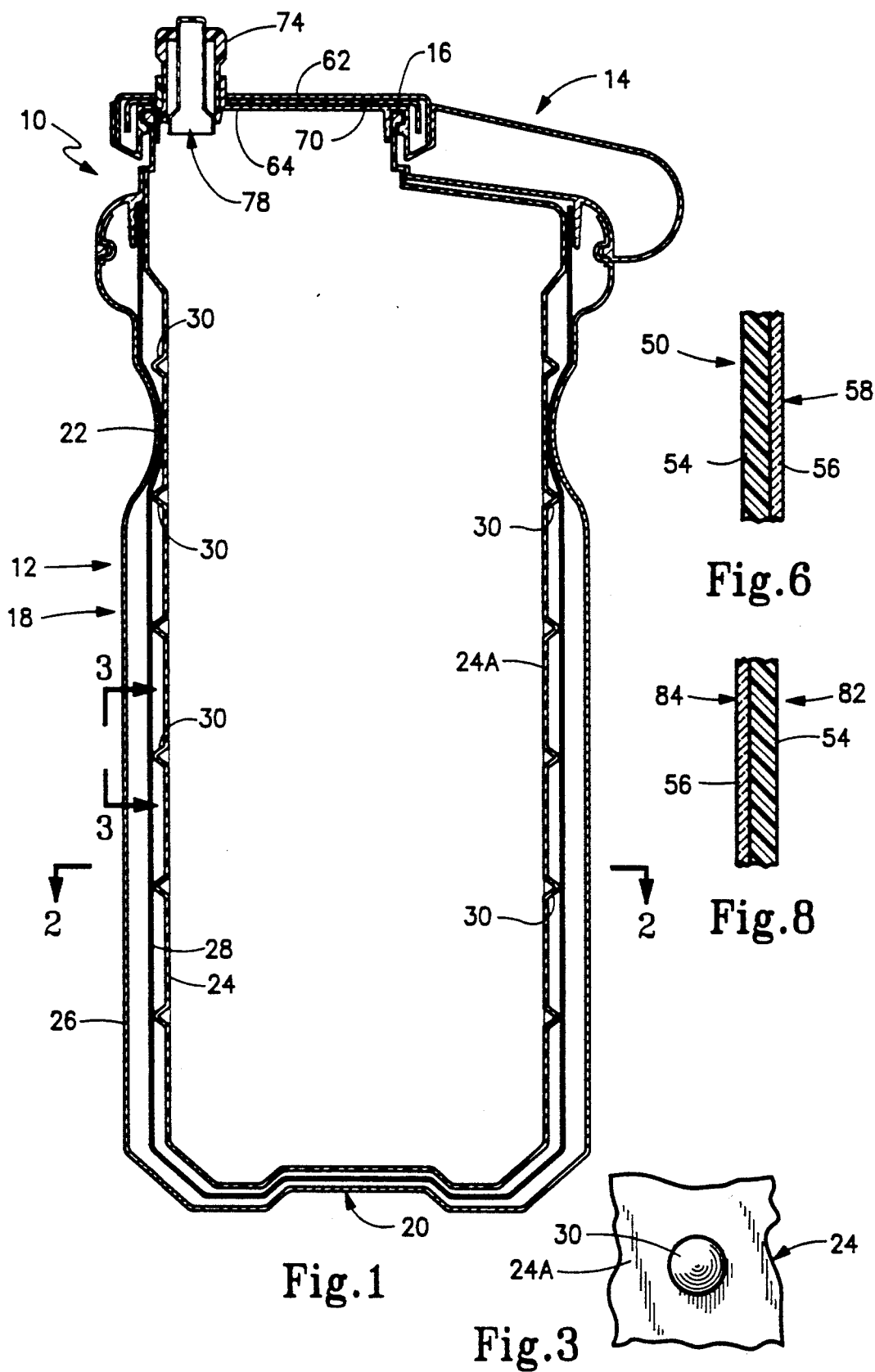

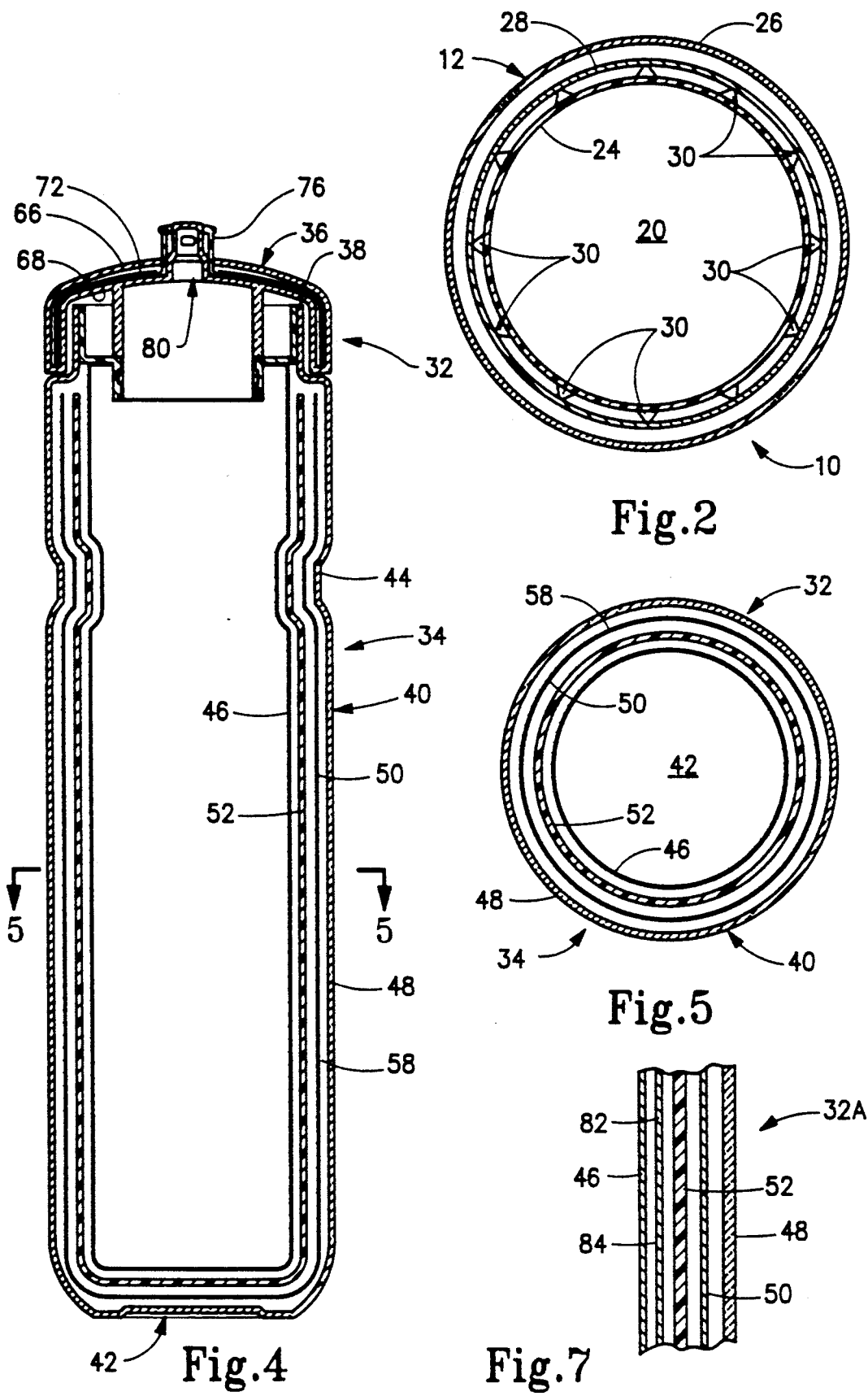

BOTTLE WITH REFLECTIVE BARRIER LAYER FOR REDUCING ELECTROMAGNETIC ENERGY TRANSFER

BACKGROUND OF THE INVENTION

1. Field of the Invention

The present invention generally relates to insulated bottle construction and, more particularly, is concerned with a container body construction for a thermally insulated bottle incorporating a reflective barrier layer which reduces transfer of radiant electromagnetic energy across the barrier layer.

2. Description of the Prior Art

There are a great number of outdoor activities that require an individual to be in the sun for long periods of time. Often these activities are physically challenging and are practiced at places where the only water available to drink is that being carried by the individual.

Water is often carried in one or more small inexpensive plastic bottles on the user's body. Such a bottle typically dispenses its liquid contents through a top closure by the user manually squeezing the bottle sidewall to force the liquid outwardly through a small opening in the closure. Because the bottle is often carried on the user's body and, is exposed to a warm ambient environment, typically the water has become distastefully warm by the time it is required.

Conventional practice when insulating a thermal mass from an extreme ambient temperature is to surround the thermal mass with one or more layers of insulating materials. Such construction greatly reduces the energy exchanged to or from the environment. Ordinarily, the ambient environment is quantified using a bulk ambient temperature as well as a surface velocity pattern to describe the energy transferred by convection. Often neglected by this practice is the energy transferred through electromagnetic radiation.

As a consequence, a need exists for improvement of insulated bottle construction so as to enhance bottle performance in maintaining the desired temperature of the liquid in the bottle for a longer period of time.

SUMMARY OF THE INVENTION

The present invention provides a thermally insulated bottle construction designed to satisfy the aforementioned needs. The bottle of the present invention has a container body construction incorporating a reflective metallized barrier layer that reduces transfer of radiant electromagnetic energy, particularly energy emitted by the sun, across the barrier layer of the container body. The barrier layer, in effect, acts as a mirror which reflects the wavelengths of interest.

Accordingly, the present invention is directed to a container body for a thermally insulated bottle. The container body comprises: (a) an inner means capable of holding a liquid contents; (b) an outer cup surrounding and spaced radially outward of the inner means, the outer cup having a construction sufficient to provide mechanical strength capable of supporting the inner means in an upright relation; and (c) a barrier layer disposed between the inner means and the outer cup, the barrier layer being capable of reflecting radiant electromagnetic energy back toward a source thereof so as to reduce transfer of the energy across the barrier layer. The barrier layer is composed of a reflective metallic material, such as a metallic foil.

More particularly, in a preferred embodiment, the inner means for holding liquid contents is an inner cup having a construction providing a moisture barrier capable of containing the liquid contents. The inner cup construction also provides sufficient mechanical strength capable of supporting the liquid contents in an upright relation, independently of any support and mechanical strength provided by the outer cup. Also, the outer and inner cups have semi-rigid semi-flexible constructions permitting squeezing thereof for dispensing the liquid contents.

Further, the inner cup has a plurality of protrusions formed thereon that project outwardly and engage the barrier layer for maintaining space between the barrier layer and the inner cup. The protrusions are dome shaped structures axially and circumferentially spaced from one another on the inner cup.

In an alternative embodiment, the inner means is an inner flexible bladder capable of holding a liquid contents but incapable of supporting the liquid contents in an upright relation by itself. The outer cup is the same construction as in the preferred embodiment. The barrier layer includes a flexible substrate and a metallic material deposited on a surface of the substrate defining a mirrored surface on the substrate. The container body also includes a middle insulating layer disposed inside of the outer cup and outside of the inner bladder. The middle insulating layer has a semi-rigid semi-flexible construction permitting squeezing of the middle layer upon squeezing of the outer cup for dispensing the liquid contents. The middle insulating layer is capable of resisting transfer of thermal energy across it from a source of such thermal energy.

The present invention is also directed to a thermally insulated bottle composed of the combination of either of the above-defined container body constructions and a closure cap which fits over an open top of the container body. The closure cap includes a barrier wall of substantially the same composition as the barrier layer of the container body. Also, the closure cap includes a pair of spaced exterior and interior shells, with the barrier wall being disposed between the exterior and interior shells.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawing in which:

FIG. 1 is a longitudinal sectional view of a preferred embodiment of a thermally insulated bottle in accordance with the present invention.

FIG. 2 is a cross-sectional view of the insulated bottle taken along line 2—2 of FIG. 1.

FIG. 3 is a fragmentary enlarged view of an inner cup protrusion of the insulated bottle as seen along line 3—3 of FIG. 1.

FIG. 4 is a longitudinal sectional view of an alternative embodiment of a thermally insulated bottle in accordance with the present invention.

FIG. 5 is an enlarged cross-sectional view of the insulated bottle taken along line 5—5 of FIG. 4.

FIG. 6 is an enlarged fragmentary longitudinal sectional view of a reflective barrier layer in the preferred embodiment of the insulated bottle of FIG. 4.

FIG. 7 is a fragmentary longitudinal sectional view of a modified embodiment of the thermally insulated bottle of FIG. 4 in accordance with the present invention.

FIG. 8 is an enlarged fragmentary longitudinal sectional view of the reflective barrier layer in the modified embodiment of the insulated bottle.

DETAILED DESCRIPTION OF THE INVENTION

Referring to the drawings, and particularly to FIGS. 1-3, there is shown a preferred embodiment of an thermally insulated bottle, generally designated 10, having a construction in accordance with the present invention. In its basic components, the bottle 10 includes a container body 12 and a closure cap 14 which fits over and is sealable with an open top 16 of the container body 12. Further, the container body 12 of the bottle 10 is of generally cylindrical configuration and has a continuous multi-layered sidewall 18 and bottom wall 20 and the open circular top 16. The body 12 has an annular reinforcing rib 22 located approximately two-thirds of the height of the body 12 above the bottom wall 20.

Basically, the container body 12 includes an inner body 24, an outer cup 26, and a barrier layer 28 disposed between the inner body 24 and the outer cup 26. The inner body 24 takes the form of an inner cup 24 capable of holding a liquid contents, such as water. The outer cup 26 surrounds the inner cup 24 and is spaced radially outwardly therefrom, providing space for the imposition of the barrier layer 28 therebetween. The barrier layer 28 is capable of reflecting radiant electromagnetic energy back toward a source thereof so as to substantially reduce transfer of the energy across the barrier layer 28 in either direction. The spaces between the inner cup 24, outer cup 26 and barrier layer 28 are exaggerated in FIGS. 1 and 2 for purposes of clarity of illustration.

The outer cup 26 preferably has a semi-rigid semi-flexible construction providing a moisture barrier capable of containing the liquid contents. The construction of the outer cup 26 provides sufficient mechanical strength and rigidity to support the inner cup 24 in an upright relation while providing sufficient flexibility to permit squeezing of the outer cup 26 to be able to dispense the liquid contents from the container body 12.

The inner cup 24, like the outer cup 26, preferably has a semi-rigid semi-flexible construction providing a moisture barrier capable of containing the liquid contents. Also, the construction of the inner cup 24 provides sufficient mechanical strength and rigidity to support the liquid contents in an upright relation, independently of any support and mechanical strength provided by the outer cup 26, while providing sufficient flexibility to permit squeezing of the inner cup 24 upon squeezing of the outer cup 26 for dispensing the liquid contents from the container body 12. It should be understood that, alternatively, the inner and outer cups 26 can have rigid constructions which provide the same capabilities as in the case of their semi-rigid semi-flexible constructions except lacking the ability to squeeze the container body 12 to dispense the liquid contents.

The barrier layer 28 is composed of a reflective metallic material, preferably, a metallic foil such as aluminum foil. Additionally, referring to FIGS. 1-3, the sidewall portion 24A of the inner cup 24 has a plurality of protrusions in the form of dome shaped structures 30 formed thereon that project outwardly and engage the barrier layer 28 for maintaining a substantially uniform space between the barrier layer 28 and the inner cup 24, except at the location of the annular reinforcing rib 22 on the container body 12. The protrusions 30 are spaced axially and circumferentially from one another on the inner cup 24.

Turning to FIGS. 4 and 5, there is shown an alternative embodiment of an thermally insulated bottle, generally designated 32, having a construction in accordance with the present invention. In its basic components, the bottle 32 includes a container body 34 and a closure cap 36 which fits over and is sealable with an open top 38 of the container body 34. The container body 34 of the bottle 32 is of generally cylindrical configuration and has a continuous multi-layered sidewall 40 and bottom wall 42 and the open circular top 38. The body 34 has an annular reinforcing rib 44 located approximately two-thirds of the height of the body 34 above the bottom wall 42.

Basically, the container body 32 is composed of an inner body in the form of an inner flexible bladder 46, an outer cup 48, a reflective barrier layer 50 disposed between the inner bladder 46 and the outer cup 48, and a middle insulating layer 52 disposed inside of the barrier layer 50 and outside of the inner bladder 46. The spaces between the inner bladder 46, middle layer 52, barrier layer 50 and outer cup 48 are exaggerated in FIGS. 4 and 5 (and also in FIG. 7) for purposes of clarity of illustration.

The inner bladder 46 is composed of a suitable flexible plastic material which is impermeable to fluids such that it is capable of holding a liquid contents, such as water. However, the inner bladder 46 is incapable of supporting the liquid contents in an upright relation by itself. The outer cup 48 which surrounds and is spaced radially outward of the inner bladder 46 is substantially identical to the outer cup 26 of the container body 12 of FIGS. 1 and 2.

The reflective barrier layer 50 of the container body 34 is disposed between the inner bladder 46 and the outer cup 48. Referring particularly to FIG. 6, the barrier layer 50 includes a substrate 54 and a metallic material 56, preferably in the form of a metallic foil or film, deposited on the substrate 54 defining a mirrored exterior surface 58 of the substrate 54. The barrier layer 50 thus has a reflective metallized exterior surface 58 capable of reflecting radiant electromagnetic energy back toward the source thereof so as to reduce the transfer of such radiant energy across the barrier layer 50. Particularly, the reflective metallized exterior surface 58 reflects radiant energy from the sun and the environment.

In the alternative embodiment shown in FIGS. 4 and 5, the middle insulating layer 52 is disposed between the inner bladder 46 and the reflective barrier layer 50. The middle insulating layer 52 has a semi-rigid semi-flexible construction permitting squeezing of the middle layer 52 upon squeezing of the outer cup 48 for dispensing the liquid contents. The middle insulating layer 52 can be a thermoplastic foam material that is capable of resisting transfer of thermal energy across the middle layer 52 from a source of such thermal energy.

The closure caps 14, 36 of the bottles 10 and 32 both include a pair of spaced exterior and interior shells 62, 64 and 66, 68 and a reflective barrier wall 70, 72 disposed between the respective exterior and interior shells 62, 64 and 66, 68 and of substantially the same composition as the respective reflective barrier layers 28, 50 of the container bodies 12, 32. The closure caps 14, 36 otherwise have conventional constructions. The closure cap 14 is snap fitted onto the open top 16 of the container body 12, whereas the closure cap 36 is threaded onto the open top 38 of the container body 34. The closure caps 14, 36 further include respective axially movable conventional spouts 74, 76 for opening and closing a central fluid dispensing passage 78, 80 which communicates with the interior of the inner bodies 24, 46.

The outer cups 26, 48 of the respective bottles 10, 32 are preferably constructed of a transparent blow molded thermoplastic material, such as polypropylene, with cylindrical dimensions the same as other conventional water bottles so that it can be held in the same devices that are currently used to carry conventional water bottles during various activities. The outer cups 26, 48 act as moisture barriers to prevent condensation. Also, the outer cups 26, 48 should be transparent to transmit radiant waves of electromagnetic energy, and should provide the same mechanical strength as current conventional water bottles so that the bottles 10, 32 can be squeezed easily to dispense its contents.

The metallized foil or film of the barrier layers 28, 50 can be any of several materials, such as gold, silver, and aluminum, which can make a highly reflective mirrored surface. Each of these materials has a characteristic set of advantages. However, over the range of solar irradiance, aluminum has the highest reflectance. For this application, where low cost and high reflectance over a large range of wavelengths is desired, aluminum is the preferred material.

The barrier layers 28, 50 can be in the form of a metallic foil layer by itself having the highly reflective mirrored surfaces preferably on both sides, or such surfaces can be manufactured by vacuum depositing aluminum material onto an appropriate substrate. The reflectance and transmittance of a mirrored surface is greatly affected by the rate of deposition as well as the total amount of deposition. Low cost vacuum metallizing techniques have been perfected for substrates of thin polyester films typically used to package foods that require an oxygen and ultra-violet light barrier. This same film can be used to cheaply produce a flexible mirror with a high reflectance. Another desirable benefit of these films is that they can be easily supplied with an additional layer over the metallized surface. This outer layer preserves the reflectance of the mirrored surface by providing a coating that prevents scratches and reduces oxidation while also providing a mechanical structure.

The reflective barrier layers 28, 50 of the container bodies 12, 34 and the reflective barrier walls 70, 72 of the closure caps 14, 36 are provided in the bottles 10, 32 in such a way that they are efficiently sealed against any incoming radiant energy. The barrier walls 70, 72 in the caps 14, 36 are placed near the upper end portion of the barrier layers 28, 50 in the container bodies 12, 34 such that a good light seal is formed, thus creating a darkened vessel. Further, a hermetic seal is provided between the inner cup 24 and bladder 46 and outer cups 26, 48 to prevent condensation from forming on the inner cup 24 and bladder 46 and thereby reducing the insulating capabilities of the bottles 10, 32.

It is important in the preferred constructions that all the materials composing the bottles 10, 32 be flexible so as not to increase the mechanical resistance that will be experienced when squeezing the bottles 10, 32. It is also important to use materials for the outer cups 26, 48 and barrier layers 28, 50 that have minimal absorbance of the incident electromagnetic waves.

Referring to FIGS. 7 and 8, there is shown, in fragmentary form, a modified construction of the alternative embodiment of the thermal insulating bottle, being generally designated 32A, also having a construction in accordance with the present invention. The modified construction of the bottle 32A is identical to that of the alternative embodiment of the bottle 32, except that an additional inner reflective barrier layer 82 is placed inside of the middle insulating layer 52 and adjacent to the outside of the inner bladder 46. The inner reflective barrier layer 82 includes the same substrate 54 and foil or film of metallic material 56, as the outer barrier layer 50, except that the metallic material 56 is deposited on the substrate 54 so as to define a mirrored interior surface 84 on the substrate 54. The inner reflective barrier layer 82 thus functions in reverse of the outer reflective barrier layer 50, to keep a heated fluid contained in the inner bladder 46 at a temperature elevated above the ambient temperature by reflecting infrared waves from the heated fluid back into itself. Thus, the bottle 32A is adapted to be used also for containing a heated fluid. It should be understood that the outer reflective barrier layer 50 can be omitted for some applications of the alternative bottle 32A.

It is thought that the present invention will be understood from the foregoing description and it will be apparent that various changes may be made thereto without departing from its spirit and scope or sacrificing all of its material advantages, the form hereinbefore described being merely preferred or exemplary embodiment thereof.

Having thus described the invention, what is claimed is:

1. A container body for a thermally insulated bottle adapted to hold a liquid contents and constructed to resist heat transfer between the contents and external environment said container body comprising:
   (a) an inner means capable of holding a liquid contents;
   (b) an outer cap surrounding and spaced radially outwardly of said inner means, said outer cup having a construction sufficient to provide mechanical strength capable of supporting said inner means in an upright relation;
   (c) a barrier layer disposed between said inner means and said outer cup, said barrier layer being composed of a reflective metallic material and capable of reflecting radiant electromagnetic energy back toward a source thereof so as to reduce transfer of said energy across said barrier layer;
   (d) means associated with said inner means and said barrier layer for maintaining said inner means said barrier layer in a spaced-apart relation to one another; and
   (e) an opening for receiving and dispensing liquid contents, wherein said outer cup has a semi-rigid semi-flexible construction providing a moisture barrier and permitting squeezing of said outer cup for dispensing the liquid contents.

2. The container body of claim 1 wherein said barrier layer includes a substrate and a metallic material deposited on a surface of said substrate defining a mirrored surface on said substrate being reflective on both sides of said surface.

3. A container body for a thermally insulated bottle adapted to hold the liquid contents and constructed to resist heat transfer between the contents and external environment said container body comprising:
  (a) an inner means capable of holding a liquid contents wherein said inner means for holding liquid contents is a cup having a semi-rigid semi-flexible construction providing a moisture barrier capable of containing the liquid contents;
  (b) an outer cup surrounding and spaced radially outwardly of said inner means, said outer cup having a construction sufficient to provide mechanical strength capable of supporting said inner means in an upright relation and said inner cup construction also sufficient to provide mechanical strength capable of supporting the liquid contents in an upright relation, independently of any support and mechanical strength provided by said outer cup;
  (c) a barrier layer disposed between said inner means and said outer cup, said barrier layer being capable of reflecting radiant electromagnetic energy back toward a source thereof so as to reduce transfer of said energy across said barrier layer; and
  (d) means associated with said inner means and said barrier layer for maintaining said inner means and said barrier layer in a spaced-apart relation to one another.

4. The container body of claim 3 wherein said inner cup has a plurality of protrusions formed thereon that project outwardly and engage said barrier layer for maintaining space between said barrier layer and said inner cup.

5. The container body of claim 4 wherein said protrusions are dome shaped structures axially and circumferentially spaced from one another on said inner cup.

6. A container body for a thermally insulated bottle adapted to hold a liquid contents and constructed to resist heat transfer between the contents and external environment said container body comprising:
  (a) an inner means comprising a flexible bladder capable of holding a liquid contents;
  (b) an outer cup surrounding and spaced radially outwardly of said inner means, said outer cup having a construction sufficient to provide mechanical strength capable of supporting said inner means in an upright relation;
  (c) a barrier layer disposed between said inner means and said outer cup, said barrier layer being capable of reflecting radiant electromagnetic energy back toward a source thereof so as to reduce transfer of said energy across said barrier layer; and
  (d) means associated with said inner means and said barrier layer for maintaining said inner means said barrier layer in a spaced-apart relation to one another.

7. The container body of claim 6 wherein said barrier layer is composed of a reflective metallic material.

8. The container body of claim 6 said container body including an opening for receiving and dispensing liquid contents, wherein said outer cup has a semi-rigid semi-flexible construction providing a moisture barrier and permitting squeezing of said outer cup for dispensing the liquid contents.

9. A container body of claim 6 wherein said means for maintaining said inner means and said barrier layer in a spaced apart relationship to one another includes:
  a middle insulating layer disposed inside said outer barrier layer and outside said inner bladder, said middle insulating layer being capable of resisting transfer of thermal energy by conduction across said middle layer from a source of thermal energy.

10. The container body of claim 9 wherein a second barrier layer is disposed between said middle insulating layer and said second inner bladder, said barrier layer being capable of reflecting radiant electromagnetic energy back toward a heated liquid contents of said inner bladder so as to reduce transfer of said second energy across said barrier layer.

11. A thermally insulated bottle, comprising:
  (a) a container body having an open top; and
  (b) a closure cap insertable over said open top of said container body to hermetically seal the same;
  (c) said container body including
    (i) an inner means capable of holding a liquid contents, said inner means being an inner cup having a semi-rigid, semi-flexible construction providing a moisture barrier capable of containing the liquid contents,
    (ii) an outer cup surrounding and spaced radially outward of said inner cup, said outer cup having a semi-rigid semi-flexible construction providing a moisture barrier capable of containing the liquid contents, said outer cup construction also sufficient to provide mechanical strength capable of supporting the liquid contents in an upright relation while permitting squeezing of said outer cup for dispensing the liquid contents,
    (iii) a barrier layer disposed between said inner cup and said outer cup, said barrier layer being capable of reflecting radiant electromagnetic energy back toward a source thereof so as to reduce transfer of said energy across said barrier layer, and
    (iv) spacing means associated with said inner cup and said barrier layer for maintaining said inner cup and said barrier layer in a spaced apart relationship to one another.

12. The bottle of claim 11 wherein said barrier layer is composed of a reflective metallic material.

13. The bottle of claim 12 wherein said metallic material of said barrier layer is a metallic foil.

14. The bottle of claim 11 wherein said inner cup is adapted to provide mechanical strength capable of supporting the liquid contents in an upright relation, independently of any support and mechanical strength provided by said outer cup, while permitting squeezing of said inner cup upon squeezing of said outer cup for dispensing the liquid contents.

15. The bottle of claim 14 wherein said inner cup has a plurality of protrusions formed thereon that project outwardly and engage said barrier layer for maintaining space between said barrier layer and said inner cup.

16. The bottle of claim 15 wherein said protrusions are dome shaped structures axially and circumferentially spaced from one another on said inner cup.

17. The bottle of claim 11 wherein said barrier layer includes a substrate and a metallic material deposited on a surface of said substrate defining a mirrored surface on said substrate.

18. The bottle of claim 11 wherein said closure cap includes a barrier wall of substantially the same composition as said barrier layer of said container body.

19. The bottle of claim wherein said closure cap also includes a pair of spaced exterior and interior shells, said barrier wall being disposed between said exterior and interior shells.

20. A container body for a thermally insulated bottle adapted to hold a liquid contents and constructed to resist heat transfer between the contents and external environment, said container body comprising:
 (a) an inner means capable of holding a liquid contents;
 (b) an outer cup surrounding and spaced radially outwardly of said inner means, said outer cup having a construction sufficient to provide mechanical strength capable of supporting said inner means in an upright relation;
 (c) a barrier layer disposed between said inner means and said outer cup, said barrier layer being composed of a reflective metallic material and capable of reflecting radiant electromagnetic energy back toward a source thereof so as to reduce transfer of said energy across said barrier layer;
 (d) spacer means associated with said inner means and said barrier layer for maintaining said inner means and said barrier layer in a spaced apart relationship to one another, said spacer means including a plurality or protrusions adapted to maintain space between said barrier layer and said inner means;
 (e) an opening for receiving and dispensing liquid contents, wherein said outer cup has a semi-rigid semi-flexible construction providing a moisture barrier and permitting squeezing of said outer cup for dispensing the liquid contents.

* * * * *